J. Nasmyth,
Steam Hammer,
No. 96 Reissued Sept. 10, 1846
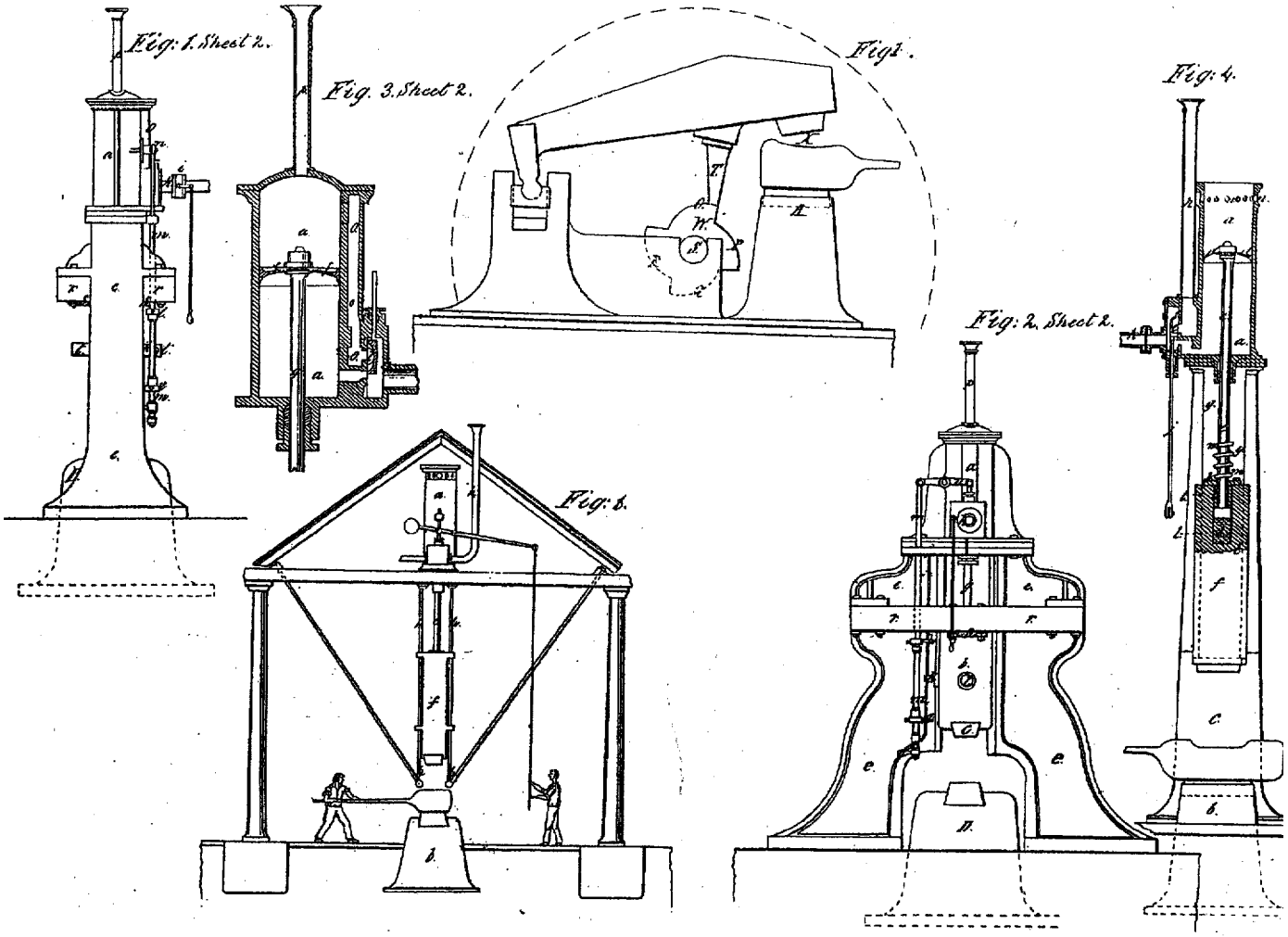
Witnesses:
John Carus
Jas Clowes
Inventor
James Nasmyth
N. PETERS, PHOTO-LITHOGRAPHER, WASHINGTON, D. C.

Sheet 1-2 Sheets
J. Nasmyth,
Steam Hammer,
No. 86 Reissued Sept. 10, 1846
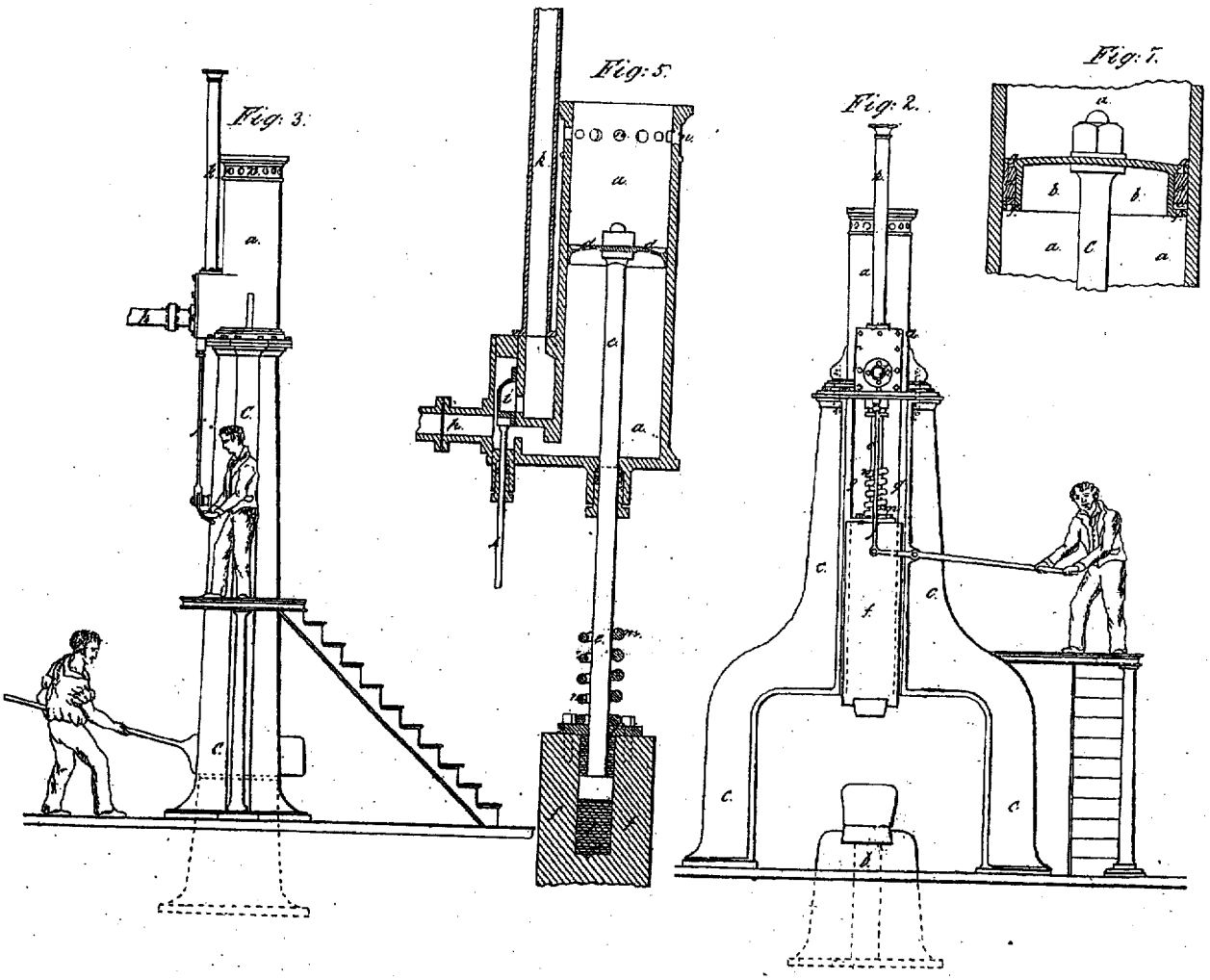
Witnesses.
John Cairns
Geo. Rand.
Inventor.
James Nasmyth
H. PETERS, PHOTO-LITHOGRAPHER, WASHINGTON, D. C.

UNITED STATES PATENT OFFICE.

JAMES NASMYTH, OF PATRICROFT, NEAR MANCHESTER, ENGLAND, ASSIGNOR TO SAMUEL V. MERRICK AND JOHN H. TOWNE, OF PHILADELPHIA, PENNSYLVANIA

IMPROVEMENT IN MACHINERY OR APPARATUS FOR FORGING, STAMPING, AND CUTTING IRON AND OTHER SUBSTANCES.

Specification forming part of Letters Patent No. 3,052, dated April 10, 1843; Reissue No. 86, dated September 10, 1846.

*To all whom it may concern:*

Be it known that I, JAMES NASMYTH, of Patricroft, near Manchester, in the county of Lancaster and Kingdom of England, engineer, have invented or discovered a new and useful invention of certain Improvements in Machinery or Apparatus for Forging, Stamping, and Cutting Iron and other Substances; and I do hereby declare that the following is a full and exact description thereof—that is to say:

In my machinery for forging or stamping metals and for other purposes I apply the elastic force of steam directly to the raising of the hammer or striking-block. This, I am aware, has been before proposed to be done, but not in a manner which admitted of its being advantageously applied to use, and, consequently, it has not been carried into operation until rendered effective by the improvements which I have made thereon.

Before setting forth the nature of my improvements in the manner of employing what may be denominated the "direct-action steam-hammer," I will describe the principle and mode hitherto employed in the application of steam and other power to machinery and apparatus for forging, stamping, and cutting iron and other substances.

In such machinery and apparatus the power has hitherto been applied to the hammer or striking-block by means of rotary motion under certain modifications hitherto employed for forging iron by means of machinery—that is, by means of certain apparatus consisting of revolving shafts and wheels, in all of which apparatus certain contrivances or mechanical arrangements have been required for converting the motion of the piston and the consequent revolving or rotary motion of the crank-shaft of the steam-engine or the axle of the water-wheel into the requisite rising and falling motion of the hammer or striking-block.

By referring to Figure 1 on the accompanying drawings a general idea will be obtained of the mode in which this is most commonly accomplished—namely, by having a cam-wheel, W, on the revolving shaft S, which, as it revolves under the tail T, enables the inclined backs of the cams O P Q R to elevate and let fall the hammer as each cam passes in succession under the tail T. It is therefore evident that the force with which the hammer strikes the work on the anvil A must be determined by the clear space X between the upper surface of the work then on the anvil and the face of the hammer at its greatest height, and it will also be evident that when a large piece of work is placed on the anvil there will be a very small fall, and consequently a slight blow, because of the small clear space between the face of the hammer and the upper surface of the work; and, on the other hand, when a small piece of work is on the anvil there will be a heavy blow, which is in fact the very reverse of that which is required; and, again, as the face of the hammer is only parallel with the face of the anvil in one position or height from the anvil the work cannot be hammered parallel, except when of one particular thickness, unless the tail of the hammer be raised to suit each particular piece of work, which is found to be most inconvenient.

The impossibility of modifying the force of the blow at pleasure, which is so desirable in most cases, and the difficulty of obtaining access to both sides of the anvil by reason of the cam-wheel W and tail T being in the way, occasion considerable inconvenience, and the expenditure of more time in executing any piece of forge-work than is desirable. To this may be added the great cost of all the complex machinery requisite for converting the rotary motion into the rising and falling motion of the hammer or striking-block, and the liability of these parts to be broken and otherwise damaged by reason of the nature of the work, and in other cases of forging, stamping, and cutting iron or other substances by means of machinery or apparatus hitherto in use for such purposes, the same kind of inconvenience, objections and disadvantages occur.

With the view of obviating the above-mentioned defects in the existing apparatus and machinery, I have so improved and constructed the direct-action steam-hammer as to be enabled to give a succession of blows with any desired and varying degree of force, and also to attain other advantages dependent on my improvements.

In Sheet 1, Fig. 2 is a front elevation of my improved direct-action steam-hammer, suitable for heavy work, and drawn upon a scale of three-eighths of an inch to the foot. Fig. 3 is a side elevation, and Fig. 4 is a vertical section, taken through about the middle of the apparatus. Fig. 5 is an enlarged view of the principal parts of the apparatus, (shown also in section,) and Fig. 6 is a general elevation of a steam-hammer, supposed to be in operation upon heavy work.

*a a* is a cylinder placed as nearly vertical as possible over the anvil *b*, said cylinder being supported by the two side standards, *c c*, or being placed on a beam above the anvil, as in Fig. 6. A piston, *d*, works in the cylinder, and is attached and connected by its rod *e* direct with the striking-block *f*, which, in this case, serves as the hammer or blow-giving part of the apparatus, the striking-block being guided in its ascent and descent by vertical guides *g g*, attached to the side frames or standards, *c c*, Figs. 2, 3, and 4, or by the guide-rods *h h*, Fig. 6. Steam of such an elastic force as by its action on the under side of the piston will freely lift or elevate the hammer or striking-block *f*, is admitted by the valve *i* into the cylinder *a* and presses upon the under side of the piston *d*, and so raises or lifts up the hammer or striking-block to such a height within the limits of the height or length of the cylinder as may be required, the striking-block *f* being now lifted by means of the steam to the required height, the valve is moved by the valve-rod and handle *j*, so as not only to shut off or prevent any further entrance of steam, but is so moved down as to permit the steam, which supports the weight of the hammer or striking-block *f*, to escape by the pipe *k*. The instant this is done the hammer or striking-block *f* descends with the full force due to the height of its fall, and so gives a proportionably powerful and intense blow to the work then on the anvil. The handle *j* is again raised, either by means of the downward action of the block *f* or by the hand of the attendant, as may be found most convenient, and the steam is again permitted to enter the cylinder and press on the under side of the piston. The hammer or striking-block is thus raised as before, and by thus admitting and letting out the so-admitted steam a rising and falling motion is given to the hammer or striking-block *f* by the direct action of the steam, and without the necessity for any rotary motion apparatus—such as shafts, wheels, &c.—and, what is of great importance, the height of fall, and therefore the intensity of blow, may be regulated at pleasure, and the work may be struck by a surface-hammer or cutting-instrument or die (of any required form) the face of which hammer, cutting-instrument, or die will at all times maintain its parallelism or same relative position with reference to the surface of the anvil or sustaining-block, whatever be the distance between them; also, the force of the blow from that due to the full height of fall as permitted by the limit of the cylinder may be changed at any instant to a gentle tap or minute blow, which are capabilities or properties of great practical value, and are important features of this instrument, add to which the great simplicity and therefore much smaller first cost of the entire apparatus, and the great and peculiar facilities which it gives for the execution of every variety of forge-work from the free access which it affords to the face of the anvil from both sides, as seen in Figs. 2 and 3, and from all sides, as in the case of Fig. 6, when the cylinder and block *f* are supported on a beam over the anvil, and this last-mentioned arrangement I conceive will be peculiarly valuable in hammering large sheets or surfaces of metal, as in the manufacture of coppers and large pans, and the stamping of plates with any particular device or embossing, and in the cutting out of any large pattern or figure, and the stamping or breaking up of large masses of ores and other obdurate substances.

In applying the principle of the direct action of the steam to raising the hammer or striking-block as above described, it is important to attend to the manner in which I form the connection between the piston-rod and the hammer or striking-block *f*, and which constitutes a very important improvement therein—namely, by interposing an elastic or compressible substance, *l*, between the upper and under sides of the collar on the lower end of the piston-rod—so that the piston-rod may convey its motion and lifting power to the block *f* through the medium of such elastic or compressible substance *l*—such as wool, cork, wood, leather, caoutchouc, or other similar compressible and elastic substance or substances—the object of this compressible and elastic medium being to remove any bad effect from the shock or jerk which might otherwise be transmitted to the piston, piston-rod, or cylinder, either at the instant of the blow being given or of the steam being suddenly let on in the case where very high-pressure steam is used; and in order, further, to obviate this latter objection, arising from the sudden admission of the steam, the under edge of the valve *i* is cut a little obliqne to the opening into the cylinder, so that the entrance of the steam commences at one corner of the said opening and the piston begins to move without any jerk.

By reference to Fig. 4 the situation of the compressible substance above and under the knob or end of the piston-rod is indicated at *l l*, the substance in question being retained by the bottom of the cylindrical recess at *l'* and the top cover or collar at *l''*, which also serves to enable the hammer or striking-block *f* to be disconnected from the piston-rod at any time, if required. A strong helical spring, *m*, is also placed around the piston-rod and between the cylinder and the hammer or striking-block *f*, in order to prevent any sudden concussion between the hammer or block (in case of the block being raised too high) and the bottom of the cylinder, which helical spring serves also to assist the quick return of the block.

With regard to the means which I give in this my invention of suspending or stopping the action of the hammer at any required instant, all that has to be done in that case is simply to open the valve by the handle *j*, so that the steam is permitted to enter below the piston, and so continue to sustain it in any required position. The hammer or striking-block *f* is thereby suspended; but in order to keep it suspended for any great length of time, a catch or pin may be placed through one of the side guides, *c c*, so that the block may rest upon it. The steam may then be entirely shut off. I would also remark that additional impulse may be given to the hammer or striking-block by causing the upper surface of the piston to be acted on by the full pressure of the steam from the boiler at the instant the piston arrives at the top of the cylinder, according to usual and well-known arrangements in steam-engines; also, the progress of the piston may be arrested at the top and bottom of the cylinder by the interposition of a cushion of steam above and below, according to the method well known to practical engineers; but such arrangements are not, according to my experience, so convenient or advantageous as those above described.

In order to prevent the piston from being driven too high in the cylinder, the upper part of the cylinder is perforated with a series of openings, *n n*, to allow the steam to escape should the piston reach that level.

I would now direct particular attention to the peculiar construction of the piston employed in the steam-cylinder in this apparatus. The first is exhibited clearly at *d* in the sectional figures just described, and will be seen to be composed of brass or other metal, and formed of a dished or umbrella shape. This is in order that as the steam exerts its pressure upward the piston may be caused to expand as it ascends, and thus secure the tightness or packing without any other elastic substance being interposed between it and the cylinder, while, on the contrary, the descent of the piston is facilitated by the partial collapse of the piston from the diminution of the pressure of the steam on the other side; and I would further observe that by the construction just described the piston is rendered as light as possible, being reduced nearly to a simple plate, whereby the mischief which would result both to the piston and the piston-rod in case the former were a heavy mass is obviated. The second description of piston that I employ for this purpose is represented in the detached section, Fig. 7, where *a a* is the steam-cylinder; *b b*, the metallic piston; *c*, the piston-rod, and *d d* a packing of hemp or other suitable material. *e e* is a metallic ring, placed loosely under the packing. *f f* are a series of holes all around the bottom plate of the piston, and *g g* are a series of openings in the top plate of the piston. Now, it will be seen that upon steam in the cylinder *a a* exerting its pressure upward to lift the hammer, it will rise through the apertures *f f* in the bottom of the piston, and press the ring *e e* against the packing *d d*, and thus pack the piston and cylinder tightly as the piston ascends, the holes in the upper part of the piston permitting the steam-pressure on the under side of the ring to come into action, and it will be gradually released as the hammer falls.

I may here observe that not only may the required steam be generated by means of the waste heat of the furnace, but also one boiler, with suitable steam-pipes, may be made to work any number of such hammers which it may be capable of supplying, either all at once or in succession, in which case the power is simply conveyed to each by means of steam-pipes in place of by shafting.

In Sheet 2, Fig. 1 represents a side elevation, and Fig. 2 a front elevation, of another modification of my said invention, drawn upon a scale of about half an inch to a foot, and is intended for lighter work, where a quick succession of blows, heavy or light, is required, and in this arrangement of the machinery apparatus for admitting and shutting off the steam to raise and lower the hammer is rendered self-acting. Fig. 3 is a sectional view of the steam-cylinder, valve-box, &c., drawn upon a larger scale.

The principal arrangement of the machinery is similar to that just described, *a a* being the steam-cylinder; *b b*, the hammer or block, containing a swage-die or cutting-tool, and as required; D, the anvil; *e e*, the side frames or standards, supporting the striking machinery; *f*, the piston, and *g* the piston-rod, connected to the hammer or striking-block *b* by means of the compressible or elastic medium, as previously described.

An important feature in this last-mentioned arrangement consists in the means which I have invented of rendering the machinery self acting and capable of giving a rapid succession of blows. Supposing steam to be admitted into the valve-chamber *h* by opening the steam-cock at *i*, Fig. 1, the piston, with the hammer, will ascend. This hammer or block is provided with a stud or projecting piece, *k*, which, as it ascends, strikes a stop, *l*, upon the vertical rod *m m*, and as this rod is connected to the slide-valve rod by means of the lever *m*, it instantly shuts off the steam from the cylinder *a*, turns it into the exit-passage *o*, and allows it to enter the cylinder again above the piston and blow off at the pipe *p*. The hammer now descends, as before, and the stud or piece *k* strikes a similar stop, *g*, on the vertical stop-rod *m*, which has the contrary effect of shifting the slide-valve and turning the steam again into the cylinder below the piston. The repetition of such motions will of course give a corresponding succession of blows of the hammer or striking-block, the intensity or rapidity of which will depend upon the setting of the stops and the pressure of the steam. In the construction of this apparatus I introduce a beam of timber, *r r*, or other material capable of some slight compressibility, provided with a few thicknesses of leather as packing, and furnishing the hammer or striking-block with two projecting nogs or studs, *t t*, so that at every upward stroke of the hammer or striking-block a slight concussion and recoil shall be produced by the contact of such nogs or projections with the beam above, and thus add to the smartness of the blow upon the descent of the hammer or striking-block.

Having thus fully described the manner in which I combine and arrange the respective parts of my direct-action steam-hammer, I do hereby declare that I do not claim the attaching of the hammer or striking-block directly to the piston of a steam-engine; nor do I claim the exclusive use of the several parts herein described when taken individually; but

What I do claim as new, and desire to secure by Letters Patent, is—

1. Forming the connection between the hammer or striking-block and the piston-rod by an elastic or compressible substance or substances for the purpose of preventing the injurious effects of the shock or jerk which would otherwise be transmitted to the piston and to other parts of the machinery.

2. In combination with the direct-action steam-hammer, the method of operating the adjustable valves by connecting the hammer with the valve apparatus in the manner substantially as herein described, whereby the hammer is rendered self acting and susceptible of adjustment, as herein described.

JAMES NASMYTH.

Witnesses:
N. TIPPINS,
THOS. S. ROWLANDSON.